(12) United States Patent
Newberry et al.

(10) Patent No.: US 7,223,317 B2
(45) Date of Patent: May 29, 2007

(54) METHOD OF ASSEMBLING A STORAGE UNIT

(75) Inventors: David W. Newberry, Marion, OH (US); Klaus Fromme, Milwaukee, WI (US); Mark A. Thielke, Menomonee Falls, WI (US); James R. Heimler, Oak Creek, WI (US); Richard A. Goodare, Franklin, WI (US); Bryan H. Mullett, Hartland, WI (US); Carolyn E. Johnson, Menomonee Falls, WI (US); Thomas E. Pelt, Menomonee Falls, WI (US); Larry K. Stover, Hartland, WI (US)

(73) Assignee: The Mills Company Inc., Sandusky, OH (US)

( * ) Notice: Subject to any disclaimer, the term of this patent is extended or adjusted under 35 U.S.C. 154(b) by 229 days.

(21) Appl. No.: 10/832,586

(22) Filed: Apr. 27, 2004

(65) Prior Publication Data
US 2004/0194874 A1   Oct. 7, 2004

Related U.S. Application Data

(62) Division of application No. 10/096,773, filed on Mar. 13, 2002, now Pat. No. 6,793,299.

(51) Int. Cl.
*B32B 37/00* (2006.01)
*B29C 65/00* (2006.01)

(52) U.S. Cl. ............... 156/308.2; 156/227; 156/309.6; 493/133

(58) Field of Classification Search ................ 156/211, 156/309.6, 309.9, 69, 227, 308.2; 493/133
See application file for complete search history.

(56) References Cited

U.S. PATENT DOCUMENTS

| | | | |
|---|---|---|---|
| 359,402 A | 3/1887 | Paff | |
| 449,936 A | 4/1891 | Jackson | |
| 498,178 A | 5/1893 | Leonard | |
| 537,844 A | 4/1895 | Moore et al. | |
| 669,171 A | 3/1901 | Jefferis | |
| 726,555 A | 4/1903 | Mayer | |
| 810,415 A | 1/1906 | Jefferfs | |
| 894,504 A | 7/1908 | Jefferis | |
| 1,488,375 A | 3/1924 | Bowers | |

(Continued)

FOREIGN PATENT DOCUMENTS

EP   0 516 961 A1   12/1992

(Continued)

OTHER PUBLICATIONS

Merriam Webster definition of "locker".*

(Continued)

*Primary Examiner*—John L. Goff
(74) *Attorney, Agent, or Firm*—Foley & Lardner LLP

(57) ABSTRACT

A method of assembling a storage unit is disclosed. The method comprises applying heat to a groove separating a pair of walls to melt at least a portion of the plastic material, and pivoting the walls so that the surfaces of the groove contact and join as the melted plastic material solidifies.

15 Claims, 12 Drawing Sheets

U.S. PATENT DOCUMENTS

| | | | |
|---|---|---|---|
| 1,806,031 A | | 5/1931 | Vignos |
| 1,833,081 A | * | 11/1931 | Kilmer ................. 217/36 |
| 1,967,506 A | | 7/1934 | Harrison |
| 1,970,267 A | | 8/1934 | Bales |
| 2,144,136 A | | 1/1939 | Albach |
| 2,195,223 A | | 3/1940 | O'Connor |
| 2,555,366 A | | 6/1951 | Peters et al. |
| 2,740,284 A | | 4/1956 | Gray |
| 2,912,271 A | | 11/1959 | Schaefer |
| 3,346,309 A | | 10/1967 | Mellion |
| 3,637,246 A | | 1/1972 | Leiter |
| 3,675,808 A | | 7/1972 | Brink |
| 3,819,246 A | | 6/1974 | List |
| 3,881,794 A | * | 5/1975 | Henning ................. 312/259 |
| 3,887,101 A | | 6/1975 | Adachi |
| 4,090,903 A | * | 5/1978 | Matsui ................. 156/211 |
| 4,098,424 A | | 7/1978 | Liebscher et al. |
| 4,099,293 A | | 7/1978 | Pittasch |
| 4,226,348 A | | 10/1980 | Dottor et al. |
| 4,391,386 A | | 7/1983 | Moret |
| 4,447,099 A | | 5/1984 | French et al. |
| 4,615,464 A | | 10/1986 | Byrns |
| 4,629,265 A | | 12/1986 | Chester |
| 4,852,920 A | | 8/1989 | DeForrest, Sr. |
| 5,005,881 A | | 4/1991 | Bailey et al. |
| 5,147,270 A | * | 9/1992 | Gronnevik ................. 493/141 |
| 5,320,239 A | | 6/1994 | Favre |
| 5,360,246 A | | 11/1994 | Leiter et al. |
| 5,372,415 A | | 12/1994 | Tisbo et al. |
| 5,490,604 A | | 2/1996 | Alexander |
| 5,573,322 A | | 11/1996 | Wrobel |
| 5,595,426 A | | 1/1997 | Wolff et al. |
| 5,673,984 A | | 10/1997 | Insalaco et al. |
| 5,683,124 A | | 11/1997 | Karpisek |
| 5,802,801 A | | 9/1998 | Hohns et al. |
| 5,951,126 A | | 9/1999 | Wolff et al. |
| 6,053,354 A | | 4/2000 | Niemeyer |
| 6,357,806 B1 | | 3/2002 | Saku |
| 6,450,599 B1 | | 9/2002 | Mamuyac |
| 6,478,071 B1 | | 11/2002 | Workman et al. |
| 6,685,285 B1 | | 2/2004 | Fromme et al. |
| 2002/0130597 A1 | | 9/2002 | Newberry et al. |

FOREIGN PATENT DOCUMENTS

WO     WO 94/15055     7/1994

OTHER PUBLICATIONS

Brochure—Bradley Corporation, Lenox Solid Plastic Lockers and Benches (One Source Central) 4 pgs.
Brochure—Bradley Corporation, Lockers, 4 pgs.

* cited by examiner

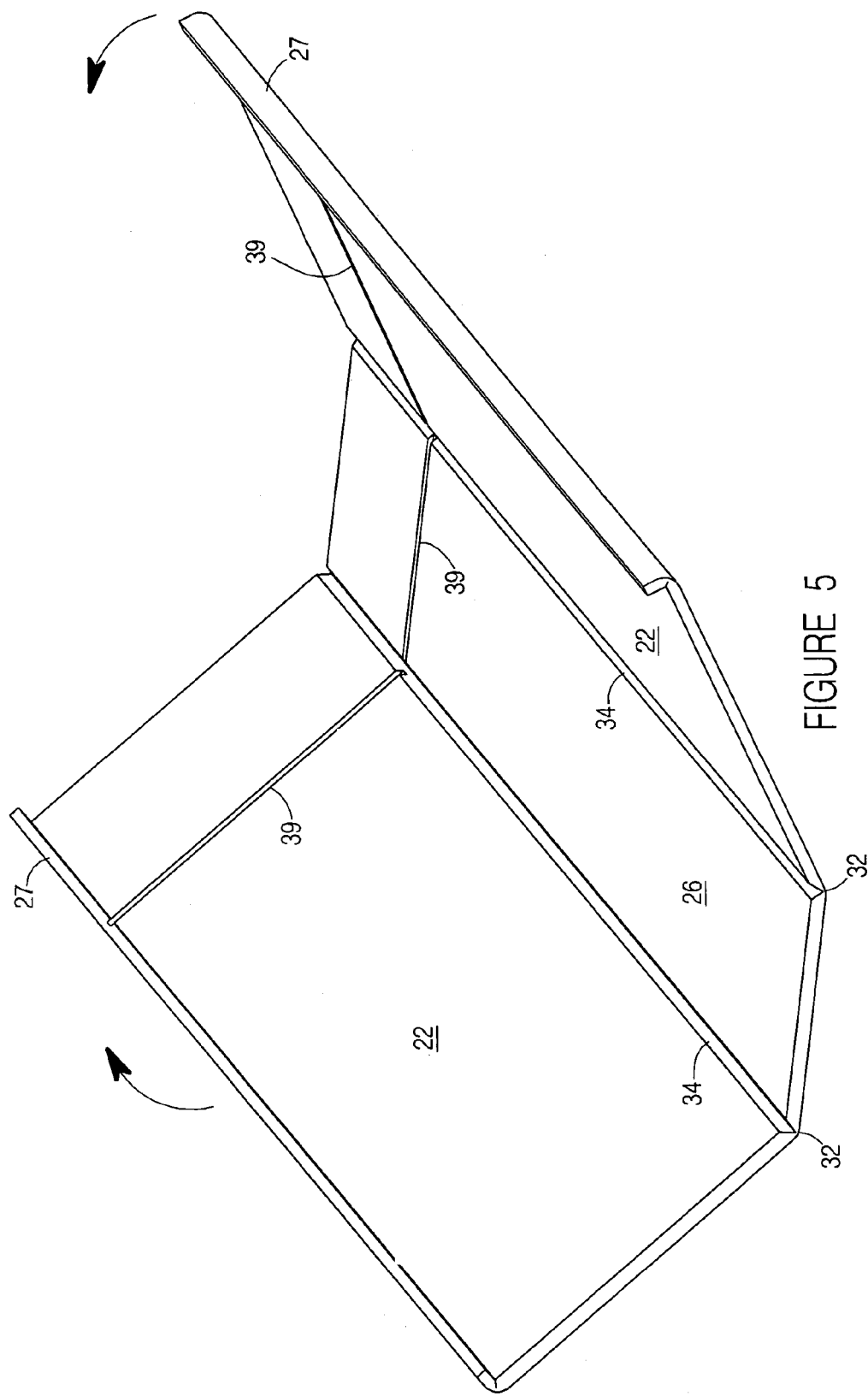

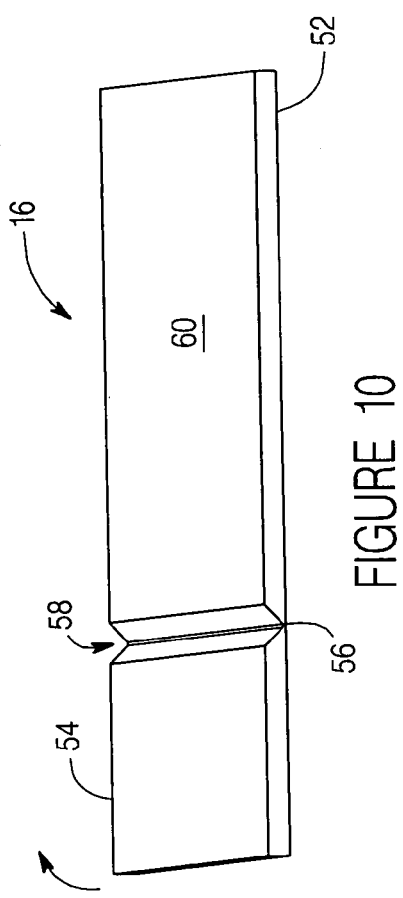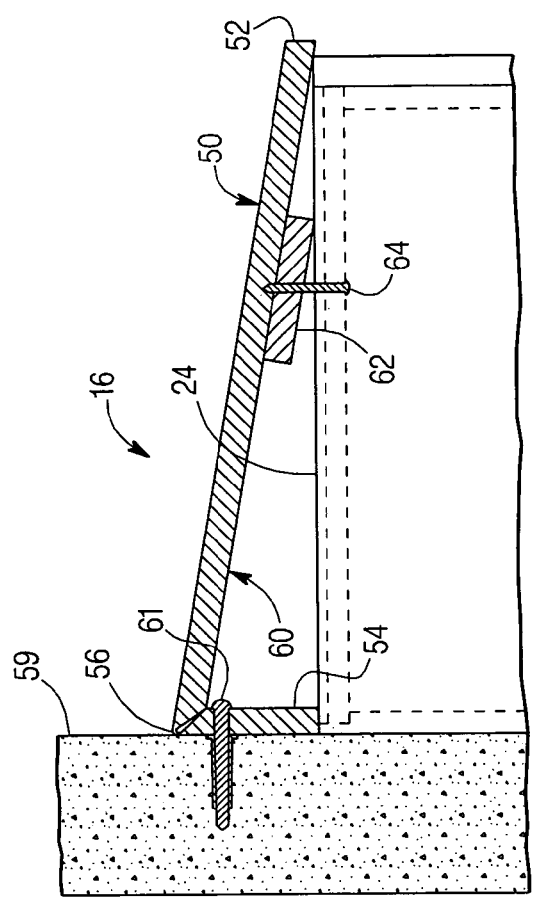

METHOD OF ASSEMBLING A STORAGE UNIT

CROSS-REFERENCE TO RELATED APPLICATIONS

The present application is a divisional application of U.S. patent application Ser. No. 10/096,773 titled "STORAGE UNIT" filed Mar. 13, 2002 now U.S. Pat. No. 6,793,299.

BACKGROUND OF THE INVENTION

The present invention relates to a storage unit. The present invention also relates to a storage unit having a box formed from a one-piece integral sheet.

It is known to provide a storage unit, such as a locker, for use in a workplace, or other institutional, public, government, educational, commercial, or municipal facility such as schools, health clubs, athletic facilities, parks, aquatic centers, military facilities, food processing plants, police departments, recreation centers, theme parks, transportation facilities (e.g., airports, bus stops, train stations, etc.), and the like. Known storage units typically include a door mounted to an enclosure or "box" comprised of side walls, a rear wall, a top, and a bottom, and may be made from plastic, metal, and other materials. The box for such known storage units typically is assembled from separate pieces using adhesive, mechanical fasteners, or dovetail joints.

However, such storage units may present disadvantages, such as a large number of parts to assemble, restrictive tolerances or undue precision required for assembly and installation, cost and time burden of assembly, overall configurations that tend to show visual defects or imperfections, the costs of skilled labor, inspection and occasional repair or quality control during and after assembly or installation, and other problems that tend to be associated with assembling and installing such known storage units. For example, aligning and joining adjacent walls (e.g., each at right angles) typically require precision drilling and alignment, multiple fixturing positions, and labor to apply the adhesive or fasteners. Even then, there may be pieces damaged (e.g., split) by the fasteners, adhesive applied to undesired locations, visual defects caused by the fixturing, and the like.

Accordingly, it would be advantageous to provide a less costly storage unit that is of a configuration that is relatively easy to assemble and install. It would also be advantageous to provide a storage unit that is constructed of fewer components and/or fabricated from fewer parts (e.g., integrally molded or machined). It would further be advantageous to provide a storage unit with or providing any one or more of these or other advantageous features.

SUMMARY OF THE INVENTION

The present invention further relates to a method of assembling a locker, the method comprising providing a unitary sheet having a first portion, a second portion, a third portion, a first web coupling the first portion to the second portion, a second web coupling the second portion to the third portion, a first groove between the first portion and the second portion, and a second groove between the second portion and the third portion; forming an enclosure by applying heat to walls of the first groove and walls of the second groove, melting at least a portion of the material to which heat is applied, and pivoting the first portion relative to the second portion about the first web and pivoting the third portion relative to the second portion about the second web so that the walls of the first groove and the walls of the second groove substantially contact.

The present invention further relates to a method of assembling a storage unit comprising providing a sheet of plastic material, and providing a pair of grooves to the sheet. The grooves may be formed by heat, by milling, during fabrication of the sheet, combinations thereof, or the like. The pair of grooves separate the sheet into a first portion, a second portion, and a third portion; The method further comprises applying a heating member to the grooves thereby melting at least some plastic material and pivoting the first portion and the second portion so that the surfaces of the grooves contact and join as the melted plastic material solidifies.

The present invention further relates to a method of assembling a locker, the method comprising providing a unitary sheet having a first portion, a second portion, a third portion, a first web coupling the first portion to the second portion, a second web coupling the second portion to the third portion, a first groove defined by a surface on the first portion and a first surface on the second portion, and a second groove defined by a surface on the second portion and a second surface on the third portion; forming an enclosure by joining the surface on the first portion to the first surface on the second portion and joining the surface on the third portion to the second surface on second portion by applying heat to walls of the first groove and to walls of the second groove, melting at least a portion of the material to which heat is applied, and pivoting the first portion relative to the second portion about the first web and pivoting the third portion relative to the second portion about the second web so that the walls of the grooves substantially contact.

DESCRIPTION OF THE FIGURES

FIG. 5 is a perspective view of the box of FIG. 3 in a partially folded condition.

FIG. 10 is a perspective view of a cap for a storage unit according to a preferred embodiment.

FIGS. 11 and 12 are side sectional views of the cap being mounted to the storage unit according to a preferred embodiment.

DETAILED DESCRIPTION OF PREFERRED AND OTHER EXEMPLARY EMBODIMENTS

Figure 1:
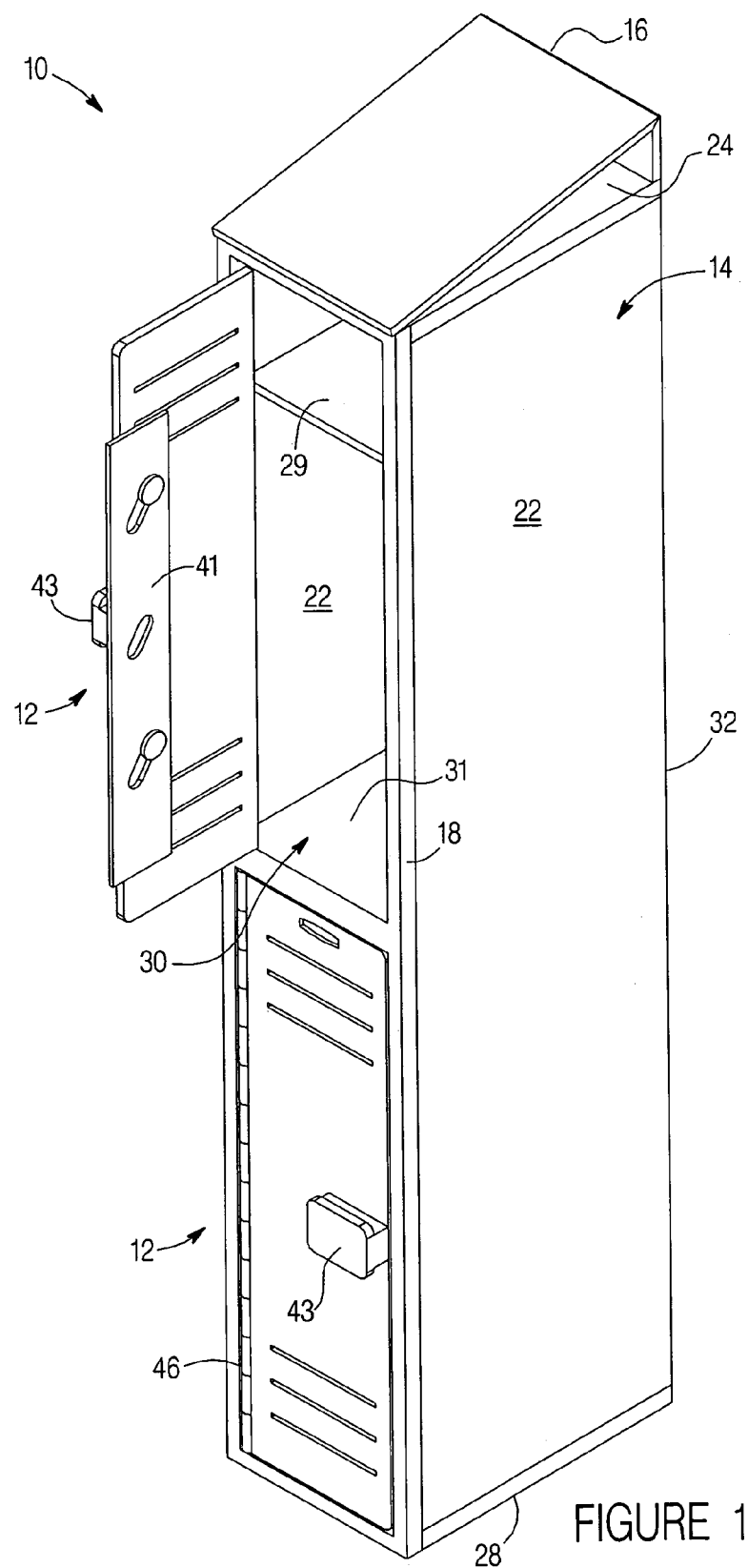
FIG. 1 is a perspective view of a storage unit according to a preferred embodiment.
Figure 2:
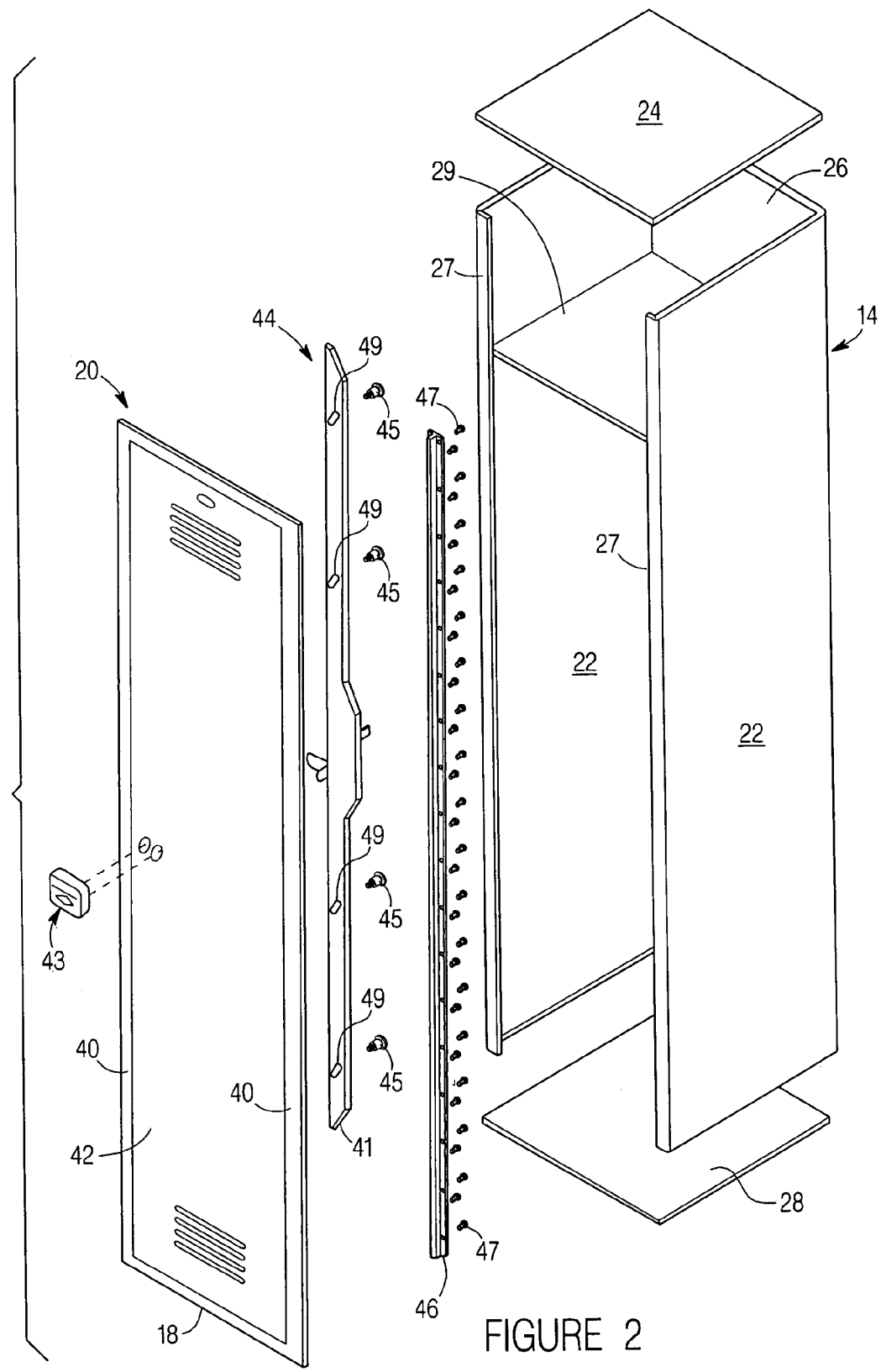
FIG. 2 is an exploded perspective sectional view of the storage unit according to an exemplary embodiment.
Figure 4:
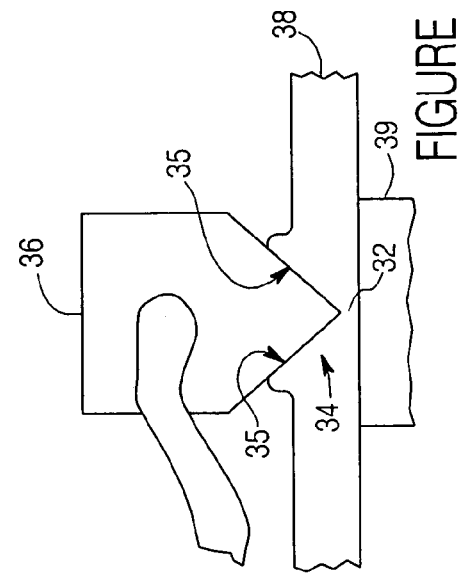
FIG. 4 is a fragmentary side elevation view of the box of FIG. 3.
Figure 3:
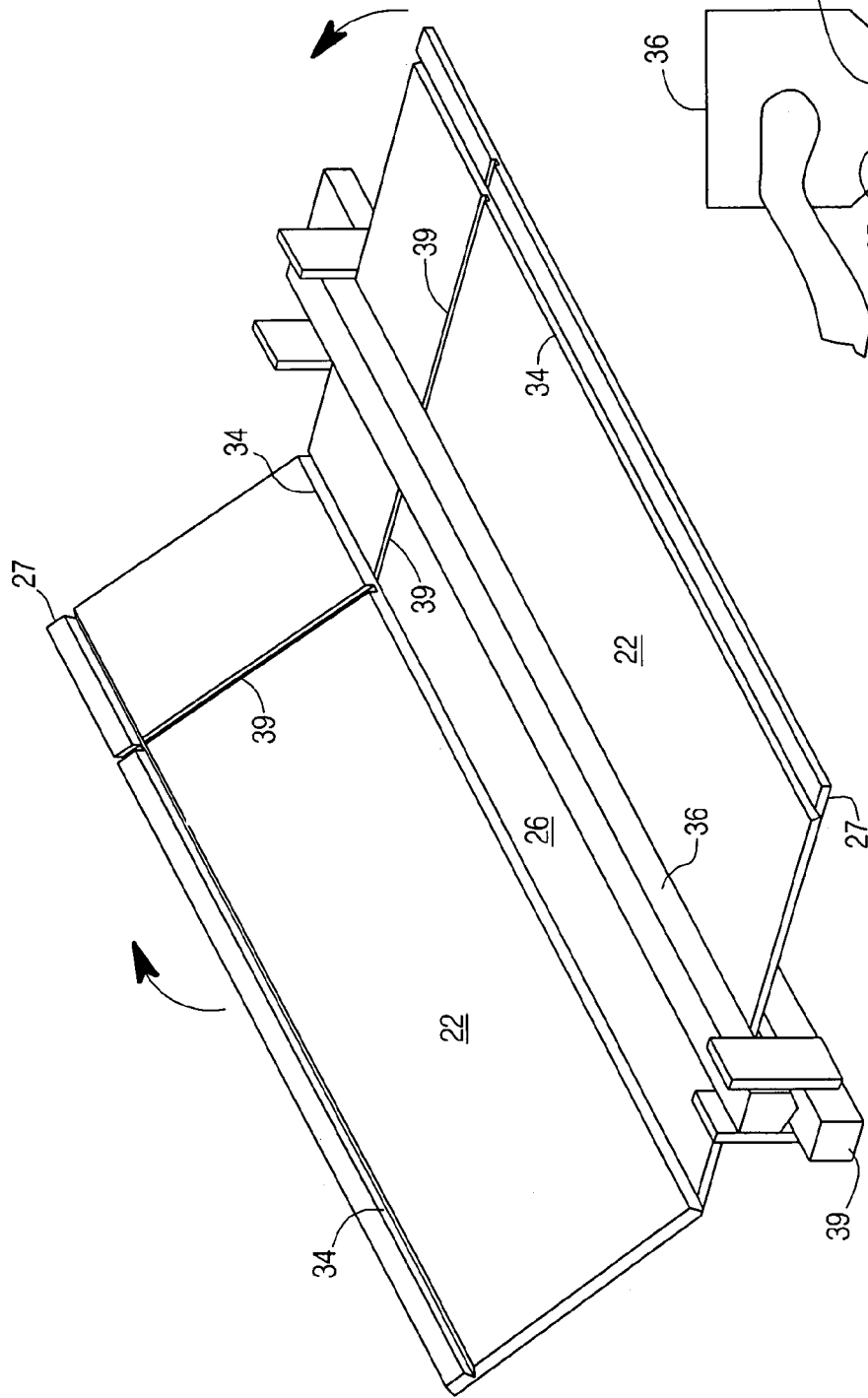
FIG. 3 is a perspective view of a box for a storage unit being heated and folded according to a preferred embodiment.
Figure 6:
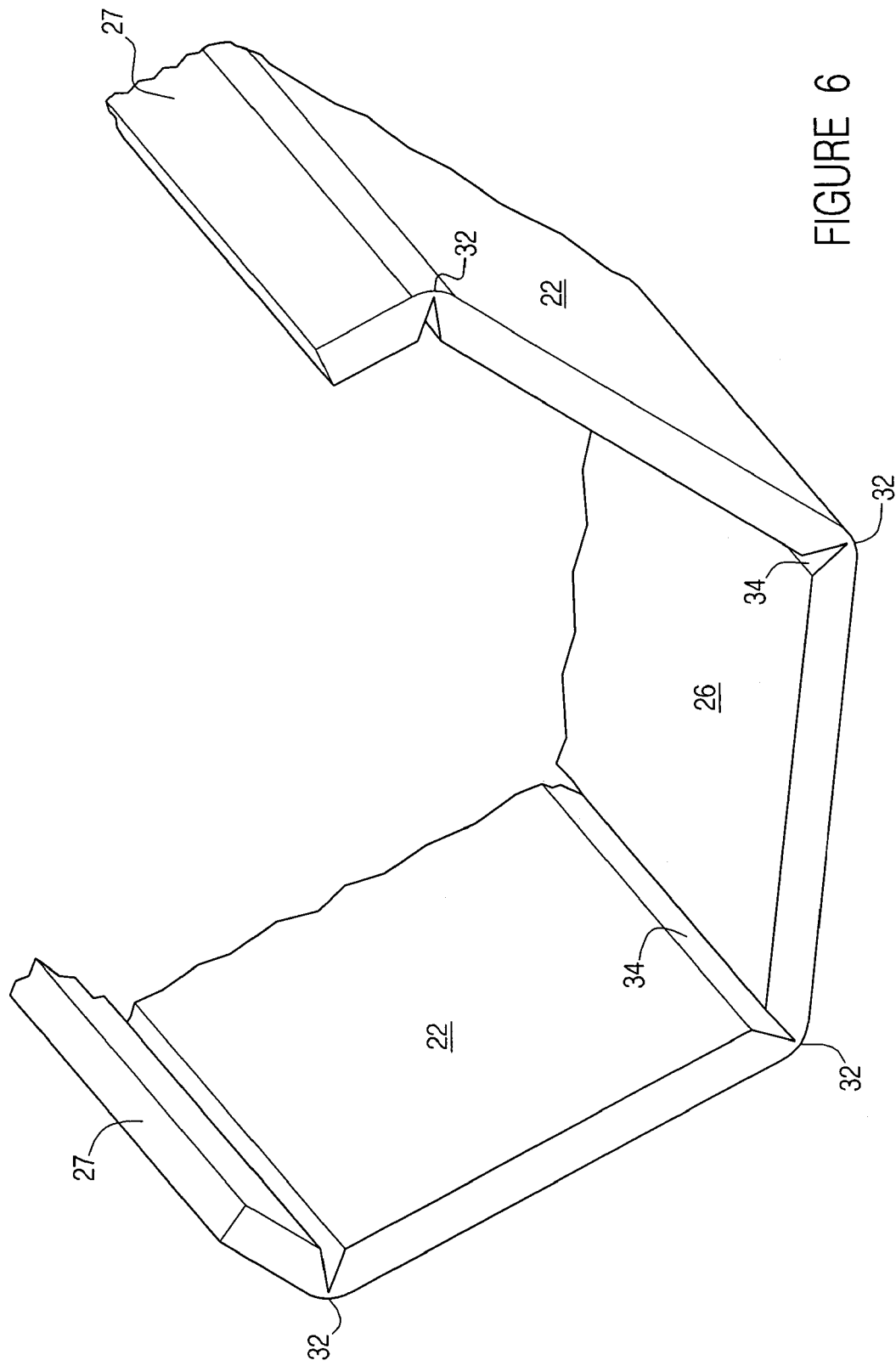
FIG. 6 is a fragmentary perspective view of the box of FIG. 3 in a mostly folded condition.
Figure 9:
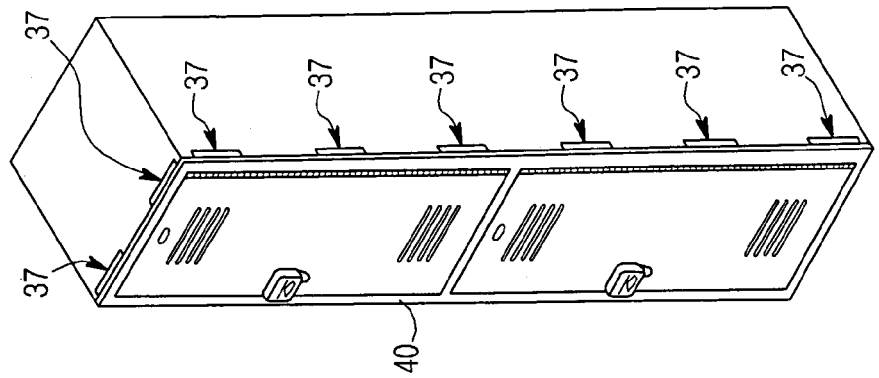
FIG. 9 is a perspective view of storage unit with a door mounted to a frame according to an exemplary embodiment.

FIGS. 1 and 2 show a storage unit (shown as a locker system 10 having one or more lockers 12) according to a preferred embodiment. Locker 12 includes a box 14, a cap 16, a frame 18, and a door assembly 20.

Figure 16:
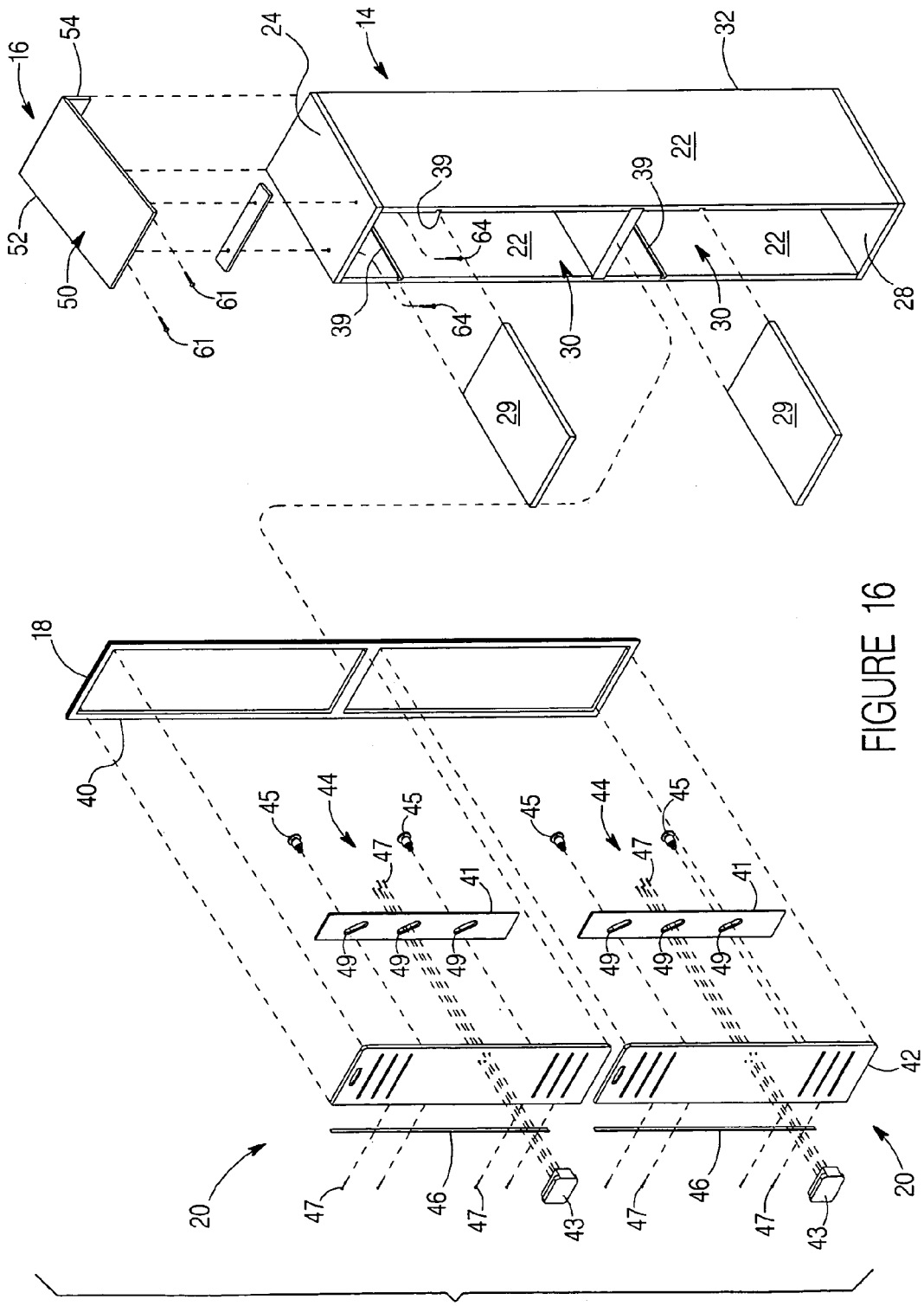
FIG. 16 is an exploded perspective view of a storage unit according to an exemplary embodiment.

Box 14 includes a plurality of walls (shown as a pair of side walls 22, a top wall 24, a rear wall 26, and a bottom wall 28) and a flange 27 that define an interior storage space 30. According to exemplary embodiments, box 14 may have any of a variety of configurations, shapes, sizes, number of walls, etc. (e.g., the box may be made of one or more walls that may provide a rectangular space or a non-rectangular space (e.g., circular, arcuate, ovular, elliptical, cylindrical, etc.). Space 30 may be configured to include one or more shelves 29, hooks, and other accessories or options intended to provide for a variety of storage arrangements. A panel (shown as a divider 31 in FIGS. 1 and 16) may be included to provide multiple lockers 12 for a single box 14.

Figure 14:
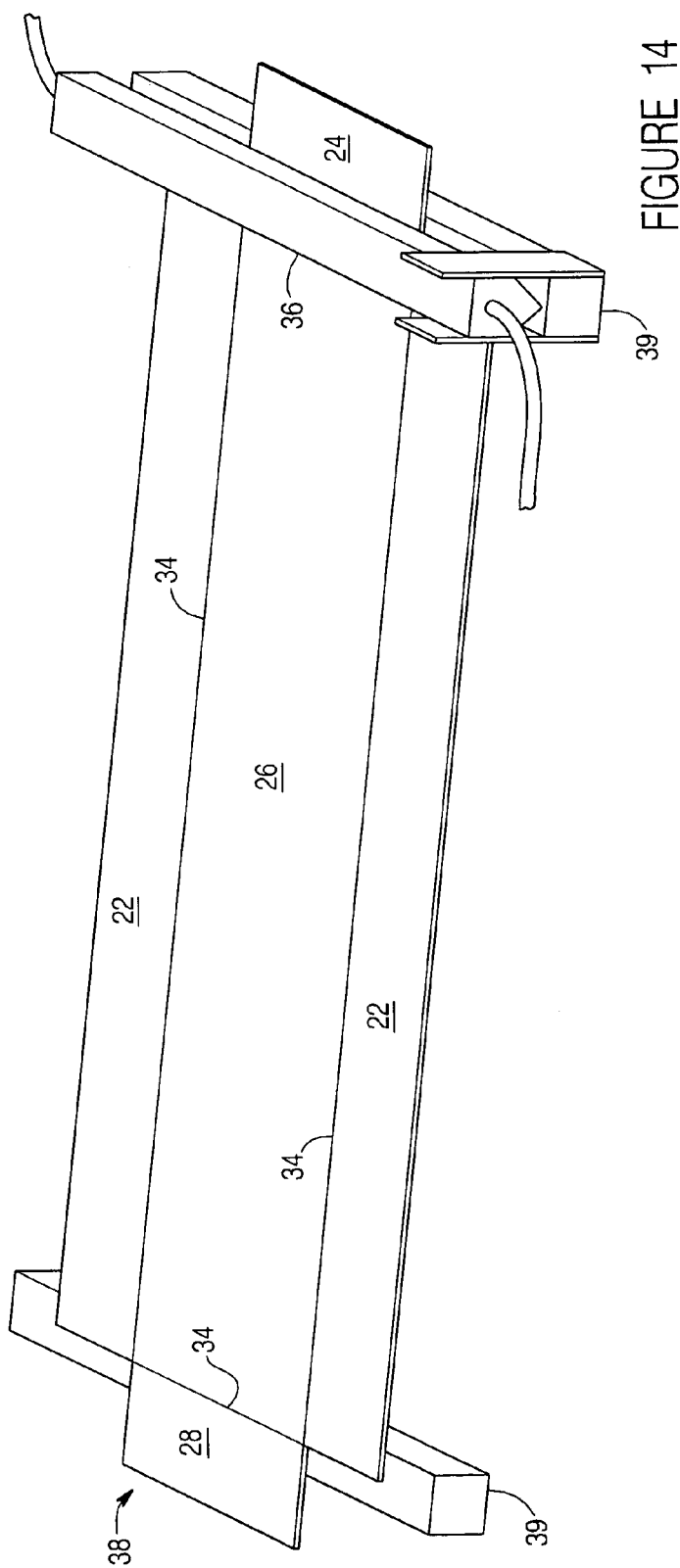
FIG. 14 is a perspective view of a heating member heating surfaces of a groove on a sheet of material to form a box for a storage unit.
Figure 15:
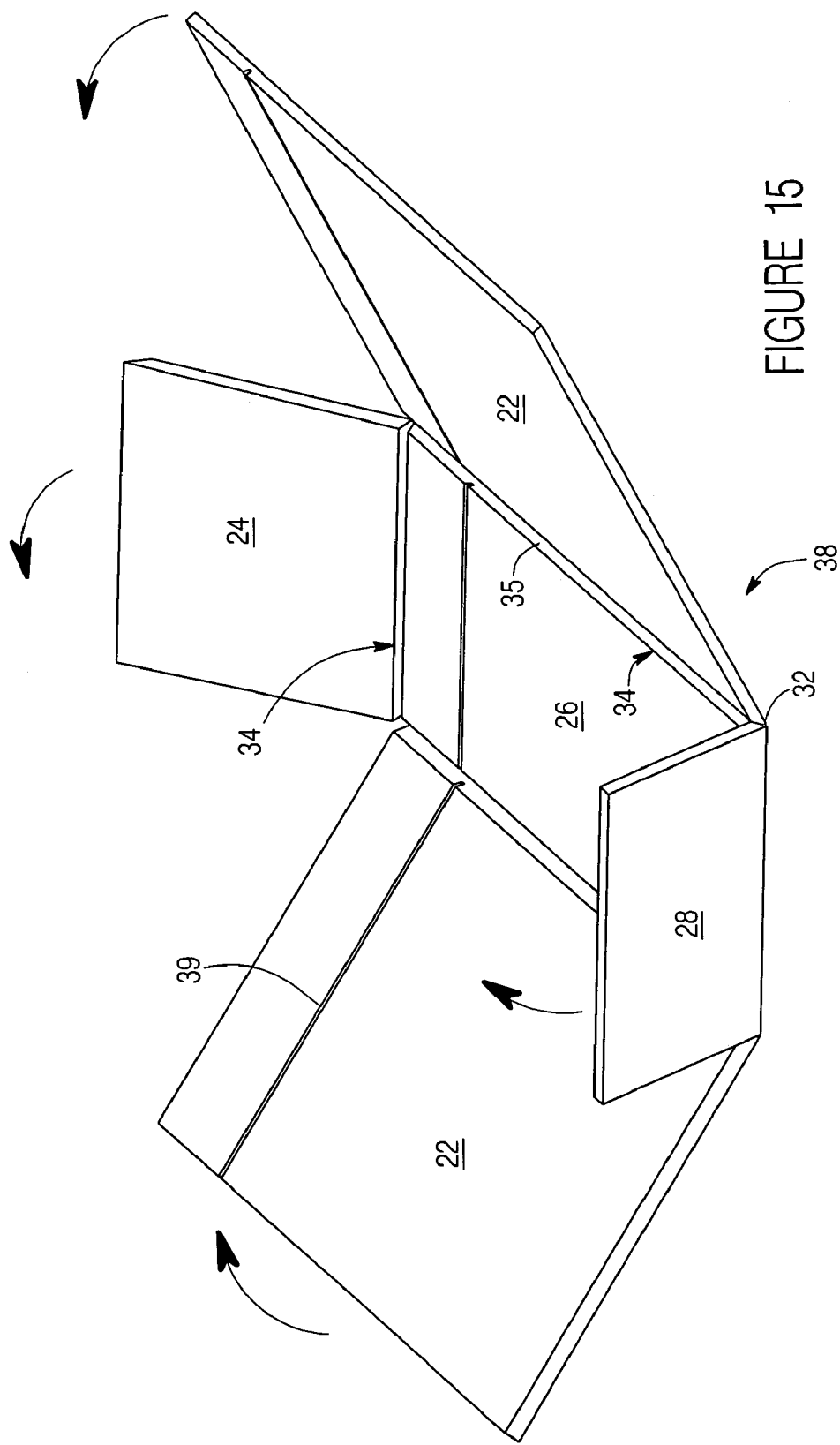
FIG. 15 is a perspective view of a box with a top wall, a bottom wall, and side walls, being folded according to an exemplary embodiment.

According to a preferred embodiment shown in FIGS. 2–5, side walls 22, rear wall 26, and flange 27 of box 14 are integrally (or unitarily) formed from a single piece (e.g., a sheet 38 of material) with the walls being connected by a web 32 (e.g., strip of material or "hinge" or the like). The enclosure is formed by pivoting or folding side walls 22 about web 32 and fixing walls 22, 26 in place. Side walls 22 and rear wall 26 may be fixed or welded in place by melting surfaces 35 of the groove 34 prior to pivoting side walls 22 in place. According to an alternative embodiment shown in FIGS. 14 and 15, the top wall and/or bottom wall are integrally formed with the side walls and rear wall from a single piece and connected by the web. According to an alternative embodiment, the side walls, rear wall, and flange of the box may be fabricated using any of a variety of techniques (e.g., extrusion, casting, various molding processes, deep drawing, etc.).

Referring to FIG. 5, web 32 is configured to provide a "living hinge" so that side walls 22 and rear wall 26 may be positioned during assembly to provide box 14 and define space 30 (e.g., rotated, pivoted, folded, etc.).

Web 32 may be formed by any of a variety of manufacturing techniques. According to a preferred embodiment, a groove 34 (e.g., a relief notch, slot, etc.) is provided to a sheet 38 (e.g., stock plastic material) to form web 32 to connect the walls and the flange. According to a particularly preferred embodiment, groove 34 is formed by removing material from sheet 38 (e.g., with one or more machining operations). According to an alternative embodiment, the groove may be formed during fabrication of the sheet (e.g., is integrally molded during casting, extrusion injection molding, extruded, etc.) such that the side walls and rear wall are formed or molded as a single piece connected by the web. According to an alternative embodiment, the groove is formed as the heating bar or member contacts the sheet and melts the plastic material. As heating member 36 is contacting surfaces 35 of groove 34, a block 48 may be used to support sheet 38.

Groove 34 may have any of a variety of configurations that allow side walls 22 and rear wall 26 to be moved to the desired position. According to an exemplary embodiment shown in FIGS. 4 and 5, surfaces 35 of groove 34 are angled (e.g., to form a "V"). According to a preferred embodiment, surfaces 35 of groove 34 are angled approximately 90 degrees relative to each other (i.e., for a rectangular or square shaped enclosure). According to alternative embodiments, other angles and configurations of the groove may be employed according to the intended shape or configuration (e.g., between about 30 degrees and about 150 degrees, between about 80 degrees and 100 degrees, an acute angle, an obtuse angle, about 60 degrees for a six-sided unit or some other angles or combination of angles).

Box 14 is assembled by flexing web 32 as flange 27 is pivoted relative to side walls 22, and side walls 22 are rotated or pivoted relative to rear wall 26. Flange 27 and walls 22, 26 of box 14 are then secured in place. According to a preferred embodiment, surfaces 35 of groove 34 are joined (e.g., fused, thermally bonded, adhesively bonded, "welded," etc.). To join surfaces 35 of groove 34, heating bar or member 36 (shown in FIGS. 3 and 4) is contacted to surfaces 35 of groove 34 to melt (or re-melt) at least a portion of the plastic material. Flanges 27 and side walls 22 are then pivoted (shown in FIG. 5) about web 32 so that the molten surface material at surfaces 35 come in contact and are held in place until the molten plastic material solidifies. According to an alternative embodiment, the walls of the box are held in place with adhesives, mechanical fasteners, or the like. Top wall 24 and bottom wall 28 may be secured to box 14 using any of a variety of ways (e.g., fused, joined, bonded, adhesive, welds, mechanical fasteners, etc.). According to a preferred embodiment, top wall 24 and bottom wall 28 are welded to box 14. According to an alternative embodiment, the top wall and/or bottom wall are slid into grooves in the box. According to a particularly preferred embodiment, box 14 is assembled by machining a plurality of grooves 34 to sheet 38 to define top, bottom, side, and rear walls, applying heating member 36 to surfaces 35 of grooves 34, and pivoting each of the walls so that surfaces 35 of the grooves 34 contact and are joined when solidified.

Figure 8:
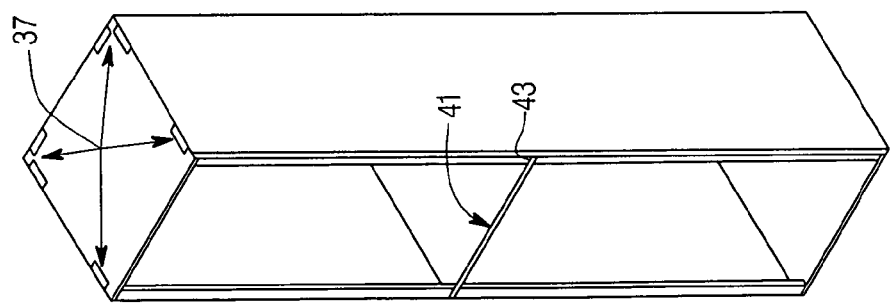
FIGS. 7 and 8 are perspective views of a box for a storage unit according to an exemplary embodiment.
Figure 7:
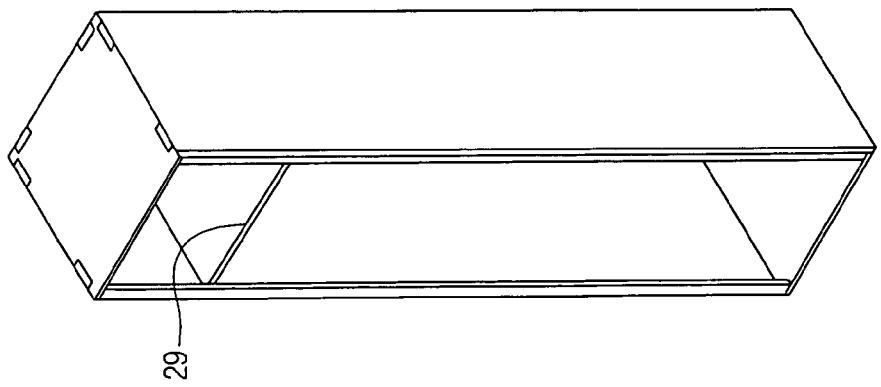
Figure 11:
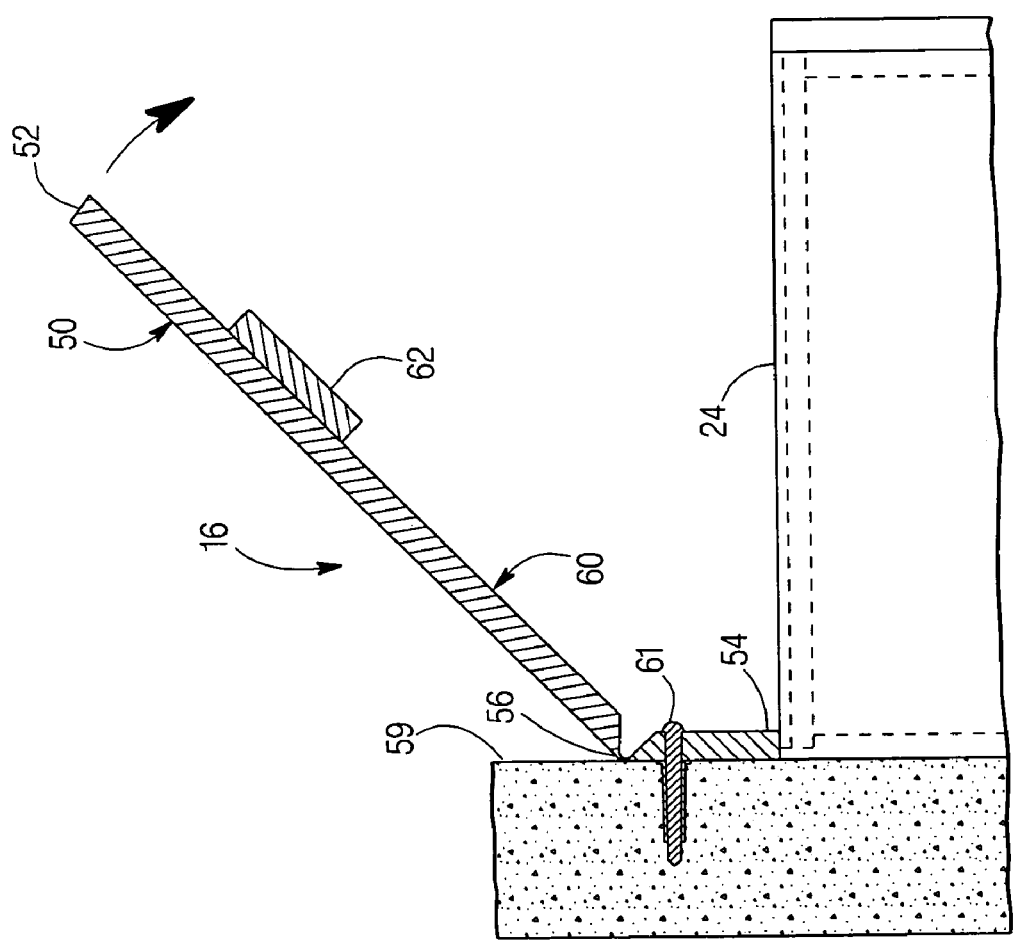
Figure 13:
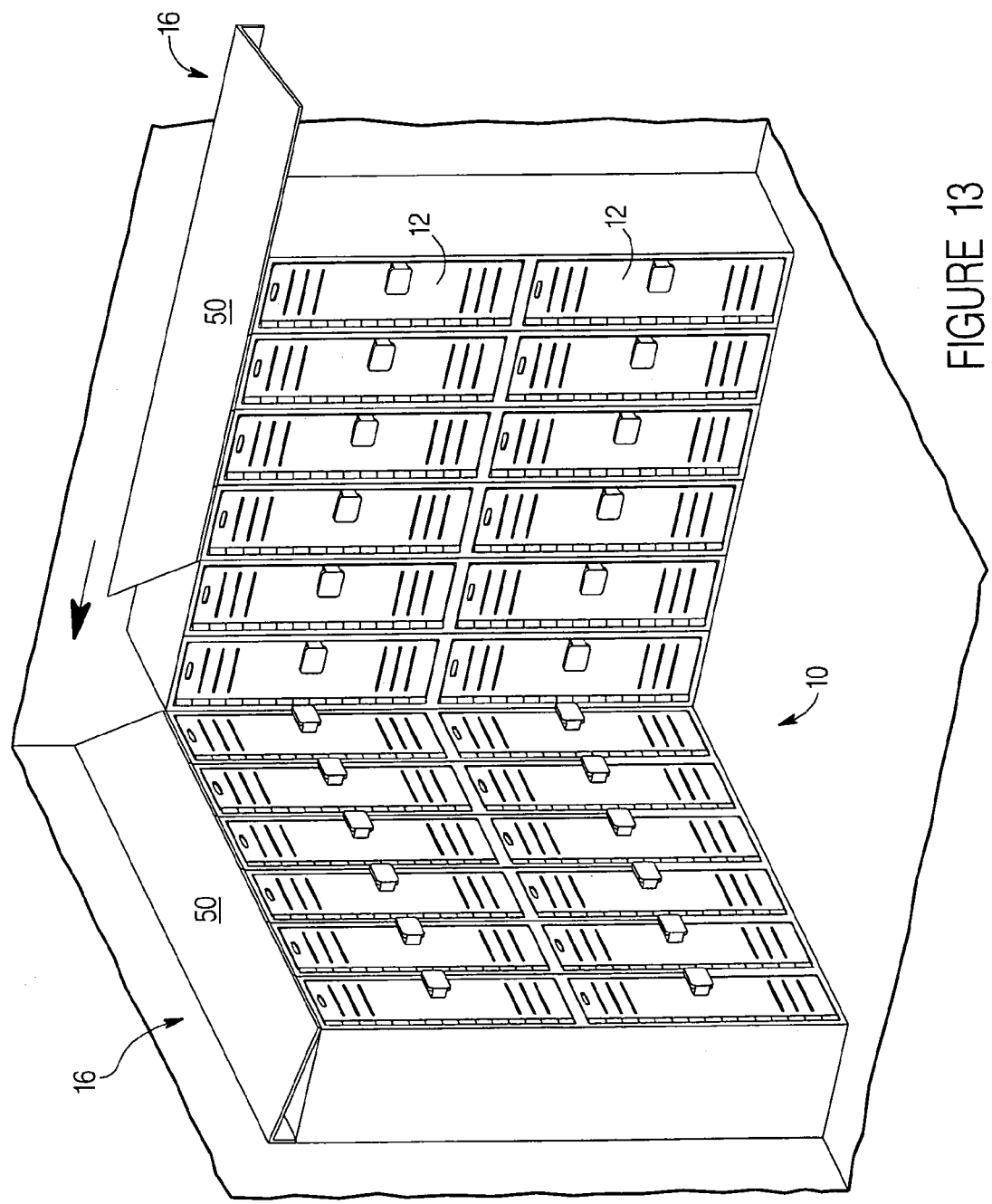
FIG. 13 is a perspective view of a locker system with a cap according to a preferred embodiment.

Shelves 29 are inserted into slots or grooves 39 and held in place by any of a variety of ways (e.g., by frame 18, by an interference fit between shelf 29 and groove 39, adhesive, fasteners, welding, etc. or any combination thereof). According to an exemplary embodiment shown in FIGS. 5 and 7, shelf 29 is located by inserting one side into groove 39 on box 14 at an angle. The other side is pivoted (e.g., slid along the wall) until edges of the shelf are in the slot in rear wall 26 (e.g., "snaps" into place). After positioning shelf in the desired location (i.e., secured in groove 39 in rear wall 26), shelf 29 is secured in place (e.g., with welds, adhesives, mechanical fasteners, etc.). According to an exemplary embodiment shown in FIG. 8, divider 31 may be positioned by inserting (e.g., sliding) through grooves or slots 39 in flanges 27 and into a slot in the walls of box 14. An edge of divider 31 remains substantially flush with front side of box 14 (i.e., flange 27).

According to a particularly preferred embodiment, a plastic weld gun is used to secure the top wall, bottom wall, shelf and/or divider in place with six, two-inch welds on the underside of the shelf starting approximately one inch from the inside corner of the box. The weld gun may be any of a variety of commercially available weld guns configured to melt adjacent material (e.g., with heat) and/or apply a bonding material (e.g., melted plastic, adhesive, etc.). According to an alternative embodiment, the shelves are secured in place before the box is formed.

Referring to FIGS. 1, 2, 8, and 9 frame 18 is secured to flanges 27 and is intended to provide a front surface 40 for locker 12. Frame 18 may be attached using any of a variety of techniques (e.g., dove tail joints, fasteners, adhesive, welded, etc.). According to a particularly preferred embodiment, the bottom and/or other sides of the frame and the box provide a flush surface. According to a preferred embodiment, frame 18 and box 14 are joined (e.g., welded, fused, bonded, etc.). According to a particularly preferred embodiment, a plastic weld gun is used to secure the frame in place with two, four-inch welds 37 on the top and bottom, and near the underside of the divider starting approximately one inch from the inside corner. Additionally, five or six four-inch welds 37 may be applied along the vertical interface, welding the side with the latch bar first, starting from the inside corner and at equal spacing. According to an alternative embodiment, the frame is attached to the side walls using any of a variety of methods (e.g., mechanical fasteners, etc.).

Assembly of box 14 may be done by the manufacture or "on site" installation of locker 12. According to a preferred embodiment, box 14 is assembled by the manufacturer along with other components of locker 12 or locker system 10. According to an alternative embodiment, the locker is assembled during or just prior to installation. When assembled by the installer, components of lockers 12 may be shipped in a "knocked-down" mode (i.e., flat), which is intended to improve handling and reduce shipping costs. The walls of box 14 may be provided with pre-drilled fastener holes intended to improve assembly and/or installation (e.g., cost, time, etc.). According to an exemplary embodiment, locker system 10 is configured as a modular unit, which is intended to increase installation and assembly options and improve installation procedures. As a modular unit, it is intended to provide flexibility in selecting a variety of configurations.

Referring to FIG. 2, door assembly 20 includes a door 42 and a latch assembly 44. Door 42 includes one or more apertures (shown as slot). According to a preferred embodiment, door 42 is attached to frame 18 with one or more hinges 46. Hinges 46 may be any of a variety of hinge arrangements configured to couple door 42 to frame 18. Hinge 46 is mounted to door 42 and frame 18 by a plurality of fasteners 47. According to an alternative embodiment, the door is coupled directly to the side wall 22. Latch assembly 44 is configured to engage frame 18 to secure door 42 in a closed position and to disengage from frame 18 so that door 42 may be opened. Latch assembly includes a latch bar 41 and a handle assembly 43. Latch bar 41 is mounted on pins 45 that slidably engage slots 49. Latch bar 41 is coupled to handle assembly by fasteners 47.

Referring to FIGS. 1 and 10–13, cap 16 provides an angled surface 50 that is intended to inhibit placement of items above locker 12 and/or provide access (e.g., actual and/or physical) to items placed on top of locker 12. Cap 16 includes a panel 52 and a mounting interface 54 connected to panel by a web 56. According to a preferred embodiment, cap 16 is integrally formed from a one-piece (e.g., sheet) of material.

The web of the cap may be provided by any of a variety of manufacturing, molding, and/or fabrication methods which provide a groove 58 (e.g., a relief notch, a "V-groove," etc.) between the panel and the mounting interface. According to a preferred embodiment, a groove 58 is provided by a machining operation that removes material from a sheet of "stock" material. According to an alternative embodiment, the groove may have any of a variety shapes and configurations which provide a relief space so that the panel and mounting interface may be rotated or pivoted, (folded) about the web. According to an alternative embodiment, the groove may be integrally molded into the cap.

According to an exemplary embodiment, cap 16 for a storage unit includes panel 52 and mounting interface 54 coupled to panel 52 by web 56. Cap 16 is configured to be mounted above the storage unit to provide angled surface 50. Mounting interface 54 may be mounted to a vertical surface so that panel 52 may be pivoted into place and coupled to the storage unit.

According to an exemplary embodiment, a method of installing cap 16 for a storage unit includes providing cap 16 having panel 52 and mounting interface 54 coupled to panel 52 by web 56, mounting interface 54 of cap 16 to a vertical surface, pivoting panel 52 so that its bottom surface is adjacent the top of the storage unit, and coupling panel 52 to the top of the surface.

During assembly of locker system 10, after lockers 12 are mounted to a vertical surface 59 (e.g., by fasteners 61, adhesive, wall anchors, etc.), mounting interface 54 of cap 16 is mounted to the vertical surface (e.g., with fasteners, stakes, adhesive, etc.). According to an alternative embodiment, the cap is mounted to the locker (e.g., the mounting interface may be connected to the top wall and/or near wall of the box, or the like). Panel 52 is then rotated (e.g., lowered) about web 56 until a bottom surface 60 of panel 52 rests on locker 12. According to a preferred embodiment, a support member 62 is provided on bottom surface 60 of panel 52. Cap 16 may be shipped in a "knocked-down" mode (i.e., flat), which is intended to improve handling and reduce shipping costs.

Support member 62 may be integrally molded with panel 52 or attached to bottom surface 60 as a separate piece with any of a variety of techniques (e.g., fasteners, adhesive, welding, etc.). With panel 52 in a lowered position, fasteners 64 may be used to attach panel 52 to top wall 24 of locker 12. According to a preferred embodiment, top wall 24 of locker 12 is connected to support member 62 by a plurality of fasteners 64.

The lockers may be provided with any of a variety of additional components, including key locks, built in combination locks, coin operated locks, end panels, solid plastic bases, mesh doors, drawers, bins, engraved logos, number plates, hooks, drawers, trim, and the like.

It is important to note that the terms "storage unit," "locker system," and "locker" are intended to be a broad term and not a term of limitation. While the components of the disclosed embodiments will be illustrated as a locker or locker system, the features of the disclosed embodiments have a much wider applicability. For example, the design is adaptable for other storage units, enclosures, bins, containers, and other office, home, or educational products that employ a storage space configured to rotate relative to a base. Further, the size of the various components and the size of the containers can be widely varied.

According to a particularly preferred embodiment, the top wall, bottom wall, frame, and/or door are made from high density polyethylene ("HDPE"). According to an alternative embodiment, any of a variety of plastic materials may be used (e.g., polypropylene, other types of polyethylene, acrylonitrile butadiene styrene ("ABS"), nylon, acrylics, any of a variety of homopolymer plastics, copolymer plastics, plastics with special additives, filled or unfilled, reinforced or non-reinforced, etc. According to an alternative embodiment, other materials (e.g., metal, plastic, etc.) may be used.

According to a particularly preferred embodiment, the cap is made from high density polyethylene ("HDPE"). According to an alternative embodiment, the box may be made from any of a variety of plastic materials (e.g., polypropylene, polyethylene, acrylonitrile butadiene styrene ("ABS"), nylon, acrylics, any of a variety of homopolymer plastics, copolymer plastics, plastics with special additives, filled or unfilled, reinforced or non-reinforced, etc.) According to an alternative embodiment, the cap may be made from any of a variety of materials (e.g., metal, plastic, etc.).

According to a particularly preferred embodiment, the heating bar is commercially available as a "Model SS-8 8-foot Bending Sword Set" from Abbeon Cal, Inc. of Santa Barbara, Calif.

It is also important to note that the construction and arrangement of the elements of the storage unit as shown in the preferred and other exemplary embodiments are illustrative only. Although only a few embodiments of the present invention have been described in detail in this disclosure, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited in the claims. For example, any of a variety of methods can be used to melt the plastic material at the surfaces of the grooves (e.g., heating elements, chemicals, ultrasonic, etc.). Also, the enclosure can be configured for a variety of sizes and shapes (having a variety of sides, curvatures, and the like). Further, the inventions described herein can be used to form an enclosure that is then configured as several locker units. Further, the grooves shown in the cap and in the disclosure may have any of a variety of shapes or configurations (e.g., V-shaped, curved, square, etc.). Accordingly, all such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and/or omissions may be made in the design, operating conditions and arrangement of the preferred and other exemplary embodiments without departing from the spirit of the present invention as expressed in the appended claims.

What is claimed is:

1. A method of assembling a locker, the method comprising:
    providing a unitary sheet having a first portion, a second portion, a third portion, a fourth portion, a fifth portion, a first web coupling the first portion to the second portion, a second web coupling the second portion to the third portion, a third web coupling the first portion to the fourth portion, a fourth web coupling the third portion to the fifth portion, a first groove between the first portion and the second portion, a second groove between the second portion and the third portion, a third groove between the first portion and the fourth portion, and a fourth groove between the third portion and the fifth portion;
    forming an enclosure by:
        applying heat to walls of the first groove, walls of the second groove, walls of the third groove, and walls of the fourth groove;
        melting at least a portion of the material to which heat is applied; and
        pivoting the first portion relative to the second portion about the first web, pivoting the third portion relative to the second portion about the second web, pivoting the fourth portion relative to the first portion about the third web, and pivoting the fifth portion relative to the third portion about the fourth web so that the walls of the first groove and the walls of the second groove substantially contact and so that the first portion, second portion, and third portion form walls of the enclosure and the fourth portion and the fifth portion form opposing flanges;
    providing a door hingedly coupled to a frame and coupling the frame to the flanges formed by the fourth portion and the fifth portion to substantially cover the flanges.

2. The method of claim 1 wherein the walls of the first groove extend from the first web at an angle relative to each other.

3. The method of claim 2 wherein the grooves provide a V-shaped cross-section.

4. The method of claim 2 wherein the angle is between about 10 degrees and about 150 degrees.

5. The method of claim 4 wherein the angle is between about 30 degrees and about 100 degrees.

6. The method of claim 5 wherein the angle is between about 60 and about 90 degrees.

7. The method of claim 6 wherein the angle is about 90 degrees.

8. The method of claim 1 further comprising the step of holding the walls of the first groove and the walls of the second groove in contact until the melted material at least partially solidifies.

9. The method of claim 1 wherein the first web has a predetermined thickness configured to provide for pivotal movement of the first portion or the second portion.

10. A method of assembling a locker, the method comprising:
    providing a unitary sheet having a first portion, a second portion, a third portion, a fourth portion, a fifth portion, a first web coupling the first portion to the second portion, a second web coupling the second portion to the third portion, a third web coupling the fourth portion to the first portion, a fourth web coupling the fifth portion to the third portion, a first groove defined by a first surface on the first portion and a first surface on the second portion, a second groove defined by a second surface on the second portion and a first surface on the third portion, a third groove defined by a first surface on the fourth portion and a second surface on the first portion, and a fourth groove defined by a first surface on the fifth portion and a second surface on the third portion;
    forming an enclosure with three walls by joining the first surface on the first portion to the first surface on the second portion, and joining the first surface on the third portion to the second surface on the second portion, and with two opposing generally vertical flanges by joining the first surface on the fourth portion to the second surface of the first portion, and joining the first surface of the fifth portion to the second surface of the third portion by:
        applying heat to surfaces defining the first groove, to surfaces defining the second groove, to surfaces defining the third groove, and to surfaces defining the fourth groove;

melting at least a portion of the material to which heat is applied; and pivoting the first portion relative to the second portion about the first web and pivoting the third portion relative to the second portion about the second web so that the surfaces of the grooves substantially contact;

coupling a door frame to, and substantially covering, the generally vertical flanges formed by the fourth portion and the fifth portion.

11. The method of claim 10 wherein the surface on the first portion extends from the first web at an angle relative to the surface on the second portion.

12. The method of claim 11 wherein the grooves provide a V-shaped cross-section.

13. The method of claim 10 wherein the first portion and the third portion are side walls of the locker, and the second portion is a rear wall of the locker.

14. The method of claim 10 further comprising the step of cooling the melted material so that the first portion is coupled to the second portion by the first web and a first bond between the surface of the first portion and the first surface of the second portion, and so that the third portion is coupled to the second portion by the second web and a second bond between the surface of the third portion and the second surface on the second portion.

15. The method of claim 10 further comprising the step of providing a door hingedly coupled to the frame.

* * * * *

UNITED STATES PATENT AND TRADEMARK OFFICE
CERTIFICATE OF CORRECTION

| | |
|---|---|
| PATENT NO. | : 7,223,317 B2 |
| APPLICATION NO. | : 10/832586 |
| DATED | : May 29, 2007 |
| INVENTOR(S) | : Newberry et al. |

It is certified that error appears in the above-identified patent and that said Letters Patent is hereby corrected as shown below:

On the cover page,

[*] Notice: Subject to any disclaimer, the term of this patent is extended or adjusted under 35 USC 154(b) by (229) days Delete the phrase "by 229 days" and insert -- by 225 days--

Signed and Sealed this

Ninth Day of October, 2007

JON W. DUDAS
*Director of the United States Patent and Trademark Office*